June 3, 1969     E. H. LENT     3,447,612

VEGETABLE PICKING MACHINE

Filed March 28, 1966     Sheet _1_ of 2

ERNEST H. LENT
INVENTOR.

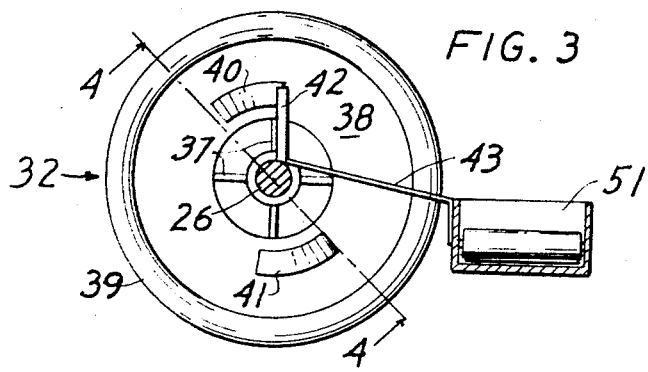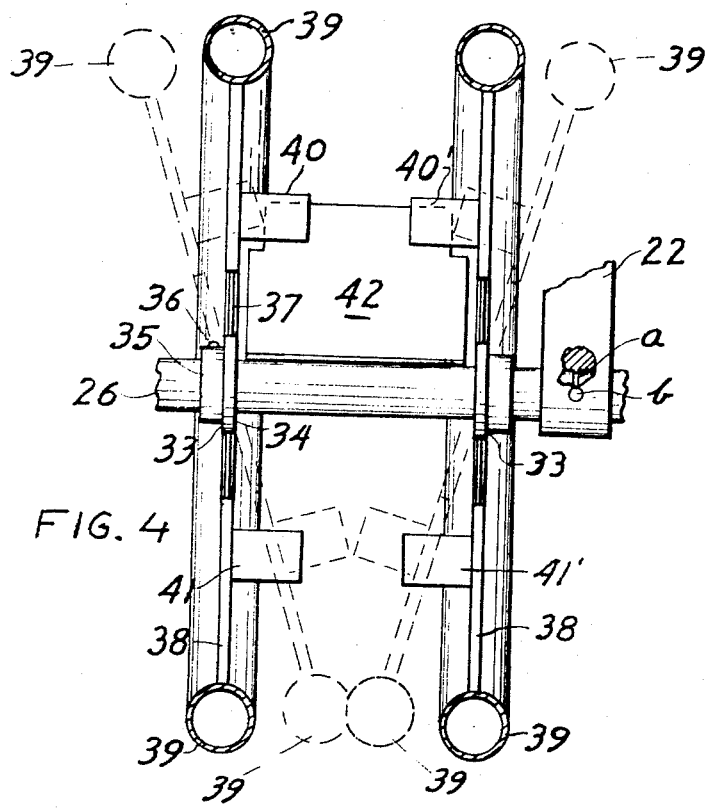

United States Patent Office 3,447,612
Patented June 3, 1969

3,447,612
VEGETABLE PICKING MACHINE
Ernest H. Lent, 2725 Kellogg Park Drive,
Pomona, Calif. 91766
Filed Mar. 28, 1966, Ser. No. 538,086
Int. Cl. A01d *13/00, 21/04, 25/02*
U.S. Cl. 171—58                                4 Claims

ABSTRACT OF THE DISCLOSURE

The invention utilizes a row of wobbling disc-like wheels arranged in pairs along a shaft wherein each pair has meeting surfaces at its bottom portion which grip the vegetable and remove it from the ground and then release it to fall upon a carrier means. Plow-like means are also employed to loosen the ground so that vegetable can easily removed.

---

This invention relates to means and ways to harvest various vegetables called ground crops such as carrots, beets, radishes, parsnips, turnips, etc.

Such ground crops, so far as known, are not successfully harvested by machine means and that wetback labor must be restorted to in order to get the crop out of the field and to the packinghouses. Various machine methods have been tried, but usually the crop damage ran too high.

This invention provides a machine capable of harvesting ground crops successfully in a most economical manner with a minimum of loss through damage and skipping. This machine gathers a high percentage of the crop and places the crop in a container automatically and which container can be readily emptied when sufficiently filled.

One of the principal objects of this invention is to present a machine for gathering and storing ground crops.

Another object is to provide a harvesting machine for picking ground crops that is economical to make and manufacture, and which machine can be operated by a single person.

Other objects of this invention will become apparent upon perusal of the specification and drawings made part and parcel hereof.

In the drawings;

FIG. 3 is an elevational view, partly in section, showing a detailed part of the invention upon a larger scale than that shown in FIG. 1;

FIG. 4 is another elevational view, with parts being shown in section, and shown on a much larger scale than that shown in FIG. 3, but taken substantially along the line 4—4 of FIG. 3;

FIG. 5 is a part sectional and part elevational view showing cam surface attached to wheel.

Figure 1:
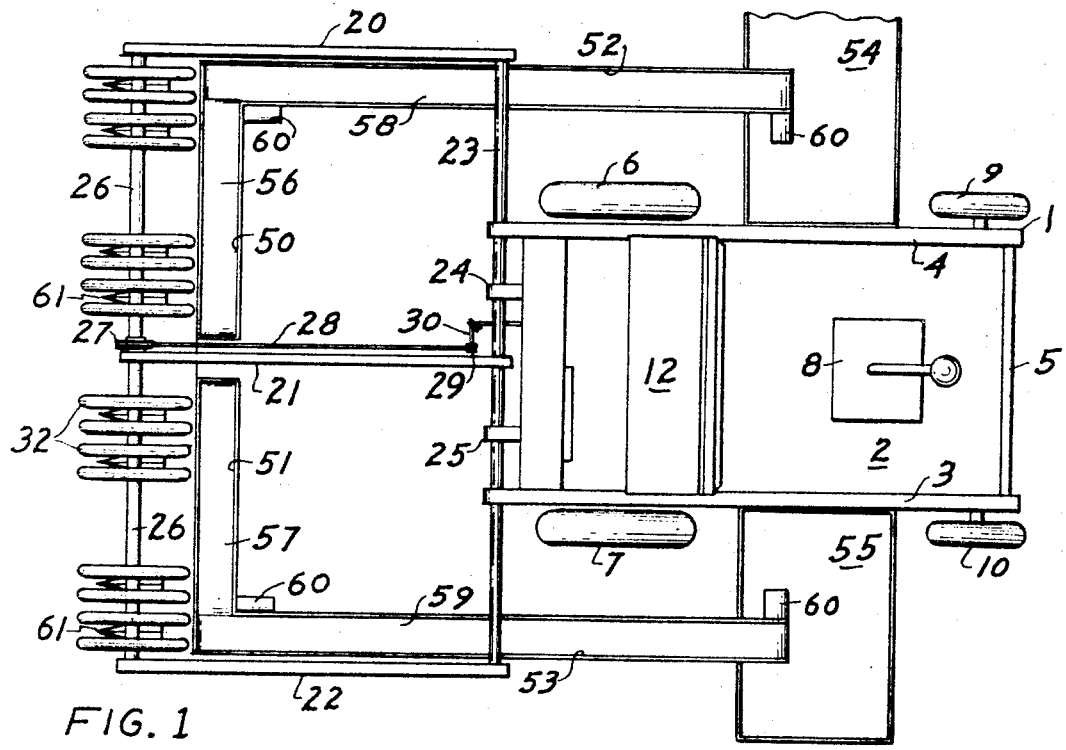
FIG. 1 is a plan view of a harvesting machine shown in association with a tractor.

The reference character 1 represents a tractor having a flood 2, spaced-apart sides 3 and 4, and a tailboard 5. The tractor has the front large tread wheels 6 and 7 through which transit motion is obtained for the tractor and all the associated parts connected therewith. The mentioned wheels are made to rotate through necessary automotive connections etc. which are not shown since they do not per se pertain to the invention. The powerplant or engine is indicated in general at 8. Rear idler wheels 9 and 10 are connected to the body 1 in a well known manner. Obviously, it is a mere matter of choice whether or not to employ a pair of rear wheels or just a single one. The powerplant is large enough to provide all the power necessary to easily transit the tractor and also to provide enough power, including proper well-known connections, to operate all the parts of the invention to be subsequently revealed.

The sides of the tractor support the base portions 11 on each side of the body and which provide a suitable seat 12 for the driver or operator. At the front end of the tractor there is a counter-like raised portion 13 which supports a control board or dashboard indicated at 14 as well as one end of a hydraulic type power unit 15 at the pivot point 16. The unit 15 gets its air supply from an air pump which is part of the engine 8. By turning a control means on the dashboard 14, the piston rod 17 can be made to extend or retract in a manner well known in this art. Such action raises and lowers a harvester frame means to be explained.

The harvester frame comprises the stretchers or beams indicated at 20, 21 and 22. Obviously, more stretchers than shown can be added if desired. Each beam has end bearing means and the upper ends are pivoted upon the axle or bar 23 which is securely fixed in position by the plurality of fixed clamping means 24 and 25 that extend outwardly and forwardly of the tractor body 1. It is particularly emphasized here, that these mentioned beams are arranged to rotate on the axle 23. The construction of the ends of these beams are shown in some detail in FIG. 4. Note, that a circular groove *a* is provided on the axle. A screw *b* which passes through the end of the beam rides in the groove *a* so that the parts concerned will stay in alinement.

The forward end of this harvester frame consists of a shaft 26 which has bearing connection with the beams 20, 21 and 22 as indicated and set out above. This shaft has keyed thereto a pulley wheel 27 which accommodates the endless belt means 28. The other end has the smaller pulley wheel 29 keyed to a jack shaft 30. The jack shaft and other associated parts are supported in any suitable manner from near portions of the body 1. By means of miter gear sets and power rods, this pulley system is powered from the engine means 8. The shaft 26 is made to rotate at various speeds for the rotary action of the plurality of the pickup units or clamping wheels 32 which are keyed to the shaft 26. Obviously, sprocket gears and chain means may be substituted for the mentioned pulleys and belt.

The clamping wheels 32 are arranged in sets in accordance to the spacing of the planting hills of the garden which contain matured carrots, etc. The wheels are, therefore, adjustable along the shaft 26 and spaced in pairs to match the spacings of the garden rows. With reference to FIGS. 3 and 4, note that each wheel is provided with a hub means 33 that has a vertical flange 34 and a horizontal flange 35 that is provided with a key means 36 so that its respective wheel can be adjusted along the shaft. This key means may be no more than the indicated setscrew.

About the vertical flange of each wheel there are the plurality of evenly spaced apart resilient spokes 37. The shaft ends of the spokes are welded or brazed to the perimeter of the vertical flange 34 and the outer ends of the spokes are welded or brazed to the inner perimeter of a steel disc-like wheel portion 38. The disc-like portion 38 has its outer edge rimmed to accommodate a soft elastic tire 39 which extends laterally well beyond its rim so that when a vegetable is squeezed between a pair of the tires, there is no danger of injuring the vegetable in any manner whatever.

Each pair of wheels 32 cooperate and work together as indicated in both solid and broken lines in FIG. 4. The bottom portions of each pair of working wheels are alternately converged together as the top portions are cammed apart to release the plucked vegetable. This action is accomplished by providing the inner surfaces of the working wheels 32 with adjusted cam slopes 40 and 41, as shown. The mating wheel also has cams as indicated at 40′ and 41′. The cam rider or spreader is a plate 42, sized as shown, and the bottom of this plate is integral with a bracket means 43 that is firmly fixed to any suitable portion of the harvester frame that is convenient; in this particular case, the bracket extends from a near trough and the other end rides neatly along the top surface of the rotatable shaft 26.

It should now be clear, that when the top portions of each set of working wheels are opened by action of the cam means, the bottom portions thereof are closed and this is the clamping position. The bottom portions are closed just before the time they reach the next plant on the hill or row. The wheels clamp firmly onto the next plant in order if one is there. When once clamped, the plant swings around with the rim of the pair of working wheels and when the top of the wheel means is opened by the cam action, the plant is thrown rearwardly into the trough, or into an elongated container that is removable. This action is continued as the working wheels rotate at a reasonable speed and as the harvester frame is slowly advanced by the transit motion of the tractor.

Figure 2:
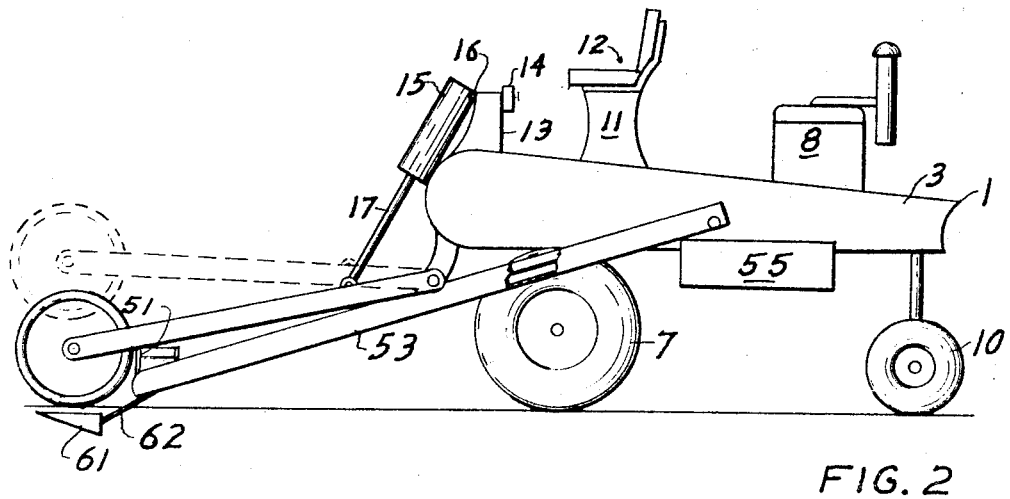
FIG. 2 is an elevational view of one side of that shown in FIG. 1; both lateral sides of the machine being substantially the same.

In FIGS. 1 and 2, the trough means 50 and 51 are shown and are supported in any suitable manner beneath and to the harvester frame. These troughs have overlapping connection with their respective lateral troughs 52 and 53. The rear ends of the lateral troughs overlap their respecitve bins 54 and 55 where final deposit of the vegetables are made. Obviously, these bins are constructed so that they can be easily removed from the tractor and replaced by empties at stations on the farm. Should elongated bins be substituted for the troughs 50 and 51, the lateral troughs 52 and 53 along with the bins 54 and 55 would be eliminated.

Each trough, when used, is provided with an endless belt means. The endless belts 56 and 57 of the forward troughs empty their contents into their respective lateral troughs having their endless belt means 58 and 59. At 60 is shown electric motors which are attached to the driver roller of its respective belt system. Obviously, the engine 8 drives a special generator to supply proper electric current to the various electric motors which should be slow speed motors.

Between the each pair of working wheels 32, there is a plow means 61 which is designed to ride a little below the surface of the plant hill and loosen the plants for easy plucking. Each plow means is fixed firmly to a rod 62 which is fixed firmly to the forward portion of its respective beams means or to the bottom portions of the forward troughs 50 and 51. If desired, special suitable framing means may be provided between the beams 20, 21 and 22 to accommodate structural means to firmly support the plows 61.

Having thus described my invention, what is claimed as new desired to be secured by Letters Patent is:

1. A vegetable picking machine comprising a frame adapted to be moved along a planted field; the machine comprising a forward portion with a cross axle journalled to the frame, pairs of wheels fixed to the axle forming clamping wheel sets, means to rotate the axle, cam means between the wheels of each set to close the bottom portions of the sets near the ground level so as to pluck vegetables in a step-by-step order, and said cam means designed to open the wheel sets at their upper portions to dispose of the plucked vegetable, the clamping wheel sets are arranged to rotate at a desirable speed and the sets are arranged upon the axle in spaced apart positions, the cam means consisting of a track on the internal surface of each wheel of each set and having hill portions, the cam means including a plate fixed in position between the wheels of each set and which rides the track to close and open the wheel sets, each wheel having a soft tire means about its periphery adapted to squeeze the plucked vegetable securely when the set is in closed position.

2. The machine recited in claim 1 wherein each wheel is provided with a hub portion and a disc-like web portion at its periphery, flexible spokes connecting the hub portion to the disc-like web portion so that the periphery of the wheel can flex from side to side with respect to the hub portion.

3. The machine recited in claim 1 wherein rod means are attached to said frame and project forwardly of the frame, the forward portion of each rod having a plow-like means which is positioned intermediate each pair of clamping wheels below the bottom portion thereof.

4. The machine recited in claim 1 wherein a catch trough means is positioned on the frame rearwardly of the clamping wheel sets to catch vegetables released by the wheel sets, and a means to transfer vegetables from the trough means to a removable bin.

References Cited

UNITED STATES PATENTS

| | | | |
|---|---|---|---|
| 551,055 | 12/1895 | Snure | 171—56 |
| 702,502 | 6/1902 | Stanton | 171—58 |
| 831,613 | 9/1906 | Jones | 171—56 X |
| 1,114,390 | 10/1914 | Serres | 171—56 X |
| 1,179,767 | 4/1916 | Siegfus | 171—58 X |
| 1,223,231 | 4/1917 | Anderson | 171—56 X |
| 2,202,433 | 5/1940 | Schumacher | 171—56 |
| 3,010,522 | 11/1961 | Oppel | 171—58 |
| 3,036,419 | 5/1962 | Magnuson et al. | 171—58 X |
| 3,127,724 | 4/1964 | Fraresso et al. | 171—58 X |

ABRAHAM G. STONE, Primary Examiner.

PASQUALE A. RAZZANO, Assistant Examiner.

U.S. Cl. X.R.

171—62